United States Patent [19]

Becker et al.

[11] Patent Number: 5,450,797
[45] Date of Patent: Sep. 19, 1995

[54] TRANSPORTING SYSTEM WITH A FLOOR CONVEYOR DEVICE GUIDED ON GUIDE RAILS

[75] Inventors: Klaus Becker; Rüdiger Ostholt, both of Wetter, Germany

[73] Assignee: Mannesmann Aktiengesellschaft, Dusseldorf, Germany

[21] Appl. No.: 122,396

[22] Filed: Sep. 17, 1993

[30] Foreign Application Priority Data

Sep. 17, 1992 [DE] Germany ............... 42 31 595.6

[51] Int. Cl.6 ............................................. E01B 7/00
[52] U.S. Cl. ............................ 104/130.07; 104/245
[58] Field of Search ............... 104/130, 124, 125, 243, 104/245, 247, 130.07; 105/72.2, 29.1, 29.2

[56] References Cited

U.S. PATENT DOCUMENTS

| | | | |
|---|---|---|---|
| 3,759,187 | 9/1973 | Gayot | 104/130 |
| 3,831,527 | 8/1974 | Peterson | 104/130 |
| 3,845,719 | 11/1974 | Langdon | 104/130 |
| 3,902,428 | 9/1975 | Peveraro | 104/130 |
| 4,000,700 | 1/1977 | Hannover et al. | 104/130 |
| 4,015,539 | 4/1977 | Hamada | 104/130 |
| 4,068,598 | 1/1978 | Bardet | 104/130 |
| 4,213,396 | 7/1980 | Mehren et al. | 104/130 |
| 4,221,171 | 9/1980 | Flaig et al. | 104/130 |
| 4,671,185 | 6/1987 | Anderson et al. | 104/130 |

FOREIGN PATENT DOCUMENTS

| | | | |
|---|---|---|---|
| 2355703 | 1/1978 | France | 104/247 |
| 2610883 | 8/1988 | France | 104/247 |
| 2721071 | 11/1978 | Germany | 104/130 |
| 9217 | 1/1977 | Japan | 104/130 |
| 1374530 | 11/1974 | United Kingdom | 104/247 |
| 1439061 | 6/1976 | United Kingdom | 104/130 |
| 1493577 | 11/1977 | United Kingdom | 104/130 |
| 93011019 | 6/1993 | WIPO | 104/130 |

*Primary Examiner*—Mark T. Le
*Attorney, Agent, or Firm*—Cohen, Pontani, Lieberman, Pavane

[57] ABSTRACT

A transporting system including, guide rails which laterally define a travel path that has branches, a floor conveyor vehicle which is guided by the guide rails and has two longitudinal sides, a pair of guide rollers which are arranged at each of the longitudinal sides of the vehicle so as to engage with the guide rails at least on one side, the pair of guide rollers including inner and outer guide rollers. A switching mechanism is provided for changing the travel path within a branch. The switching mechanism being arranged at the vehicle and including a swivel drive for the outer guide rollers of the pair of guide rollers. The outer guide rollers are supported on the vehicle so as to be swivelable between a guidance position, in which the inner and outer guide rollers engage with the guide rail, and an open position in which the outer guide rollers release the guide rail.

9 Claims, 6 Drawing Sheets

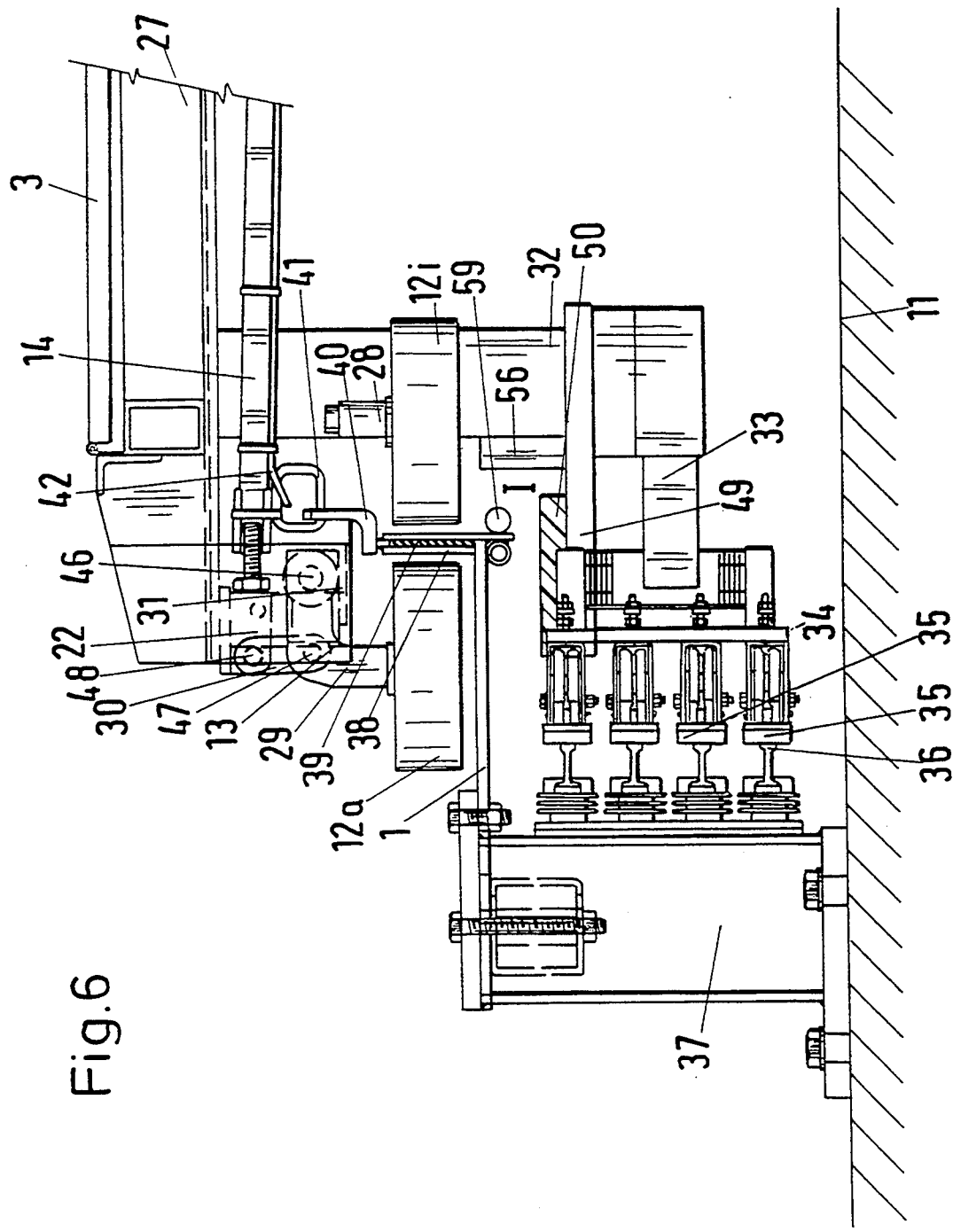

TRANSPORTING SYSTEM WITH A FLOOR CONVEYOR DEVICE GUIDED ON GUIDE RAILS

BACKGROUND OF THE INVENTION

1. Field of the Invention

The invention is directed to a transporting system having a floor conveyor device guided on guide rails.

2. Description of the Prior Art

A switch for vehicles guided on travel paths is known from DE 22 58 144 B2. Pairs of guide rollers which engage with guide walls laterally defining the travel path are arranged at the longitudinal sides of the vehicles and switches are arranged in regions where the travel path branches off. The switches are essentially formed by a horizontally swivelable guide rail which is arranged along the course of the guide wall on the side remote of the track branching off from the main track. In the region of the switch, this guide rail guides the vehicle exclusively so that the vehicle is directed straight into the main track or into the branch track depending on the swiveling position of the guide rail.

Such switches with actively swivelable guide rails have proven disadvantageous because, in addition to the costly type of construction and maintenance costs required for operation, the maximum attainable conveying output is limited. This limitation is caused by the time required for switching the guide rail. Moreover, disruptions in operation may occur if a vehicle drives into the guide rail during the course of the switching process, since adequate guidance cannot be ensured in this case at the transitions between the guide wall and the guide rail, and vice versa.

Furthermore, a wheel-and-rail arrangement for rail vehicles with flangeless supporting wheels which move on running rails is known from DE 24 11 686 C3. The rail vehicle is guided via guide wheels at both sides of the running rail and, in addition, has direction-selection wheels which, when in the region of branches, can engage in guide rails of the desired direction of travel arranged in these branch regions.

Although this rail vehicle has direction-selection wheels arranged at the vehicle, these wheels serve exclusively for selecting the track in the region of the branch and not for guiding the vehicle on the travel rail. It has the further disadvantage that the guide wheels of the vehicle reverse direction in the branch area when the guide changes from the travel rail to the guide rail, resulting in a short life of the wheels due to frictional stresses. Openings are also required at the travel rail in the region of the branches.

SUMMARY OF THE INVENTION

Accordingly, it is an object of the present invention to provide a transporting system with a floor conveying device which is guided on guide rails and, due to a simplified construction, is inexpensive to install and at the same time is less susceptible to disturbances.

Pursuant to this object, and others which will become apparent hereafter, one aspect of the present invention resides in a transporting system of the generic type in which the switching means is arranged at the vehicle and includes a swivel drive for the outer guide rollers of the pair of guide rollers. The outer guide rollers are supported at the vehicle so as to be swivelable out of a guidance position in which the inner and outer guide rollers engage with the guide rail, into an open position in which the outer guide rollers release the guide rail.

In that the switching means for changing the travel path are arranged directly at the vehicle, an advantageous simplification of the installation of the guide rails on the floor of a building and the construction of the guide rails in the region of branches is achieved according to the invention, since the guide rails can be constructed so as to be stationary and have no movable parts. It also allows the guide rails to be constructed in a continuous manner in the region of branches.

Further, by coupling the swivelable outer guide rollers via a rod linkage, so that only one of the two opposite guide rollers can be located in the guide position, it is ensured that the vehicle will not remain stuck at the diverging guide rails in the region of branches where guide rails are arranged on both sides of the travel path for a short distance. As a result of the arrangement of a safety plate at the vehicle, whereby the safety plate projects into the space between the guide rail and the travel path and its distance from the horizontal leg of the L-shaped guide rail is less than the height of the vertical leg of the guide rail, the guide rollers cannot leave the guide rail even when the vehicle drives over an obstacle, since in this event the safety plate strikes the guide rail from below.

Further, in the regions of the guide rail system where the vehicle could leave the transporting path due to faulty switching of the swivelable guide rollers, the arrangement of a stop member at the guide rails ensures that the guide rollers are switched via a driver member at the vehicle and the vehicle is then stopped. In a particularly simple embodiment of the invention the stop member is constructed as a hook which, in the event of incorrect switching, actuates the driver member which is constructed as a ring connected with the rod linkage of the outer guide rollers via a traction mechanism.

Also, an inner offset of the supporting and steering wheels is particularly advantageous in that it enables the base frame of the vehicle to drive over the guide rail in the area of curves and accordingly to travel over relatively narrow radii of curves. The arrangement of a drive wheel between the two rear supporting wheels whose axis is arranged in a vertical plane with the axes of the supporting wheels in the traveling position offers the advantage that the lateral guidance forces are taken up by the supporting wheels, and the drive wheel arranged in the center between the supporting wheels accordingly substantially delivers only driving forces. The vehicle accordingly possesses a good track stability which benefits operation of the vehicle also in the event of poor traction.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

FIG. 6 shows an enlarged section according to FIG. 5 from the region of the guide rail.

DETAILED DESCRIPTION OF THE PREFERRED EMBODIMENTS

Figure 1:
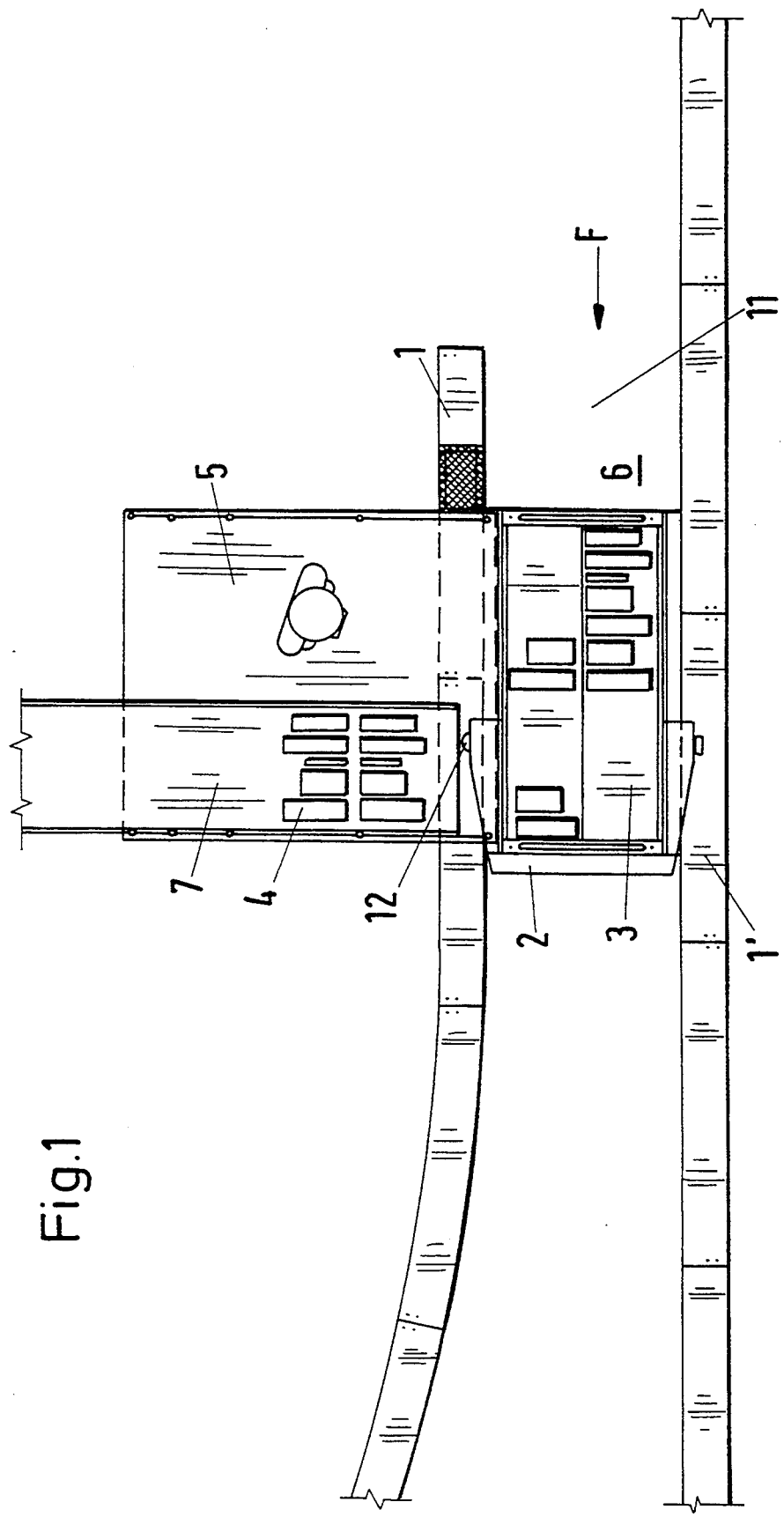
FIG. 1 shows a top view of the transporting system with a vehicle guided via a guide rail and an adjoining feed conveyor.

FIG. 1 shows a top view of a transporting system according to the invention with a vehicle 2 which is guided with guide rollers 12 at a guide rail 1 arranged on the floor 11. On the side of the travel path 6 for the vehicle 2 located opposite this guide rail 1, another guide rail 1' is arranged in the region of branches. By switching the guide rollers 12 from the guide rail 1 to the additional guide rail 1', the vehicle 2 can follow the respective course of the divergent guide rails 1, 1' and can accordingly change its traveling direction. Further, the vehicle 2 which is drivable on the floor 11 has a platform 3 which slopes inward slightly from the longitudinal sides toward the center. The platform 3 serves to receive goods 4 to be transported, e.g. suitcases, bags, or the like. The vehicle 2 is located in a transfer station 5 for luggage 4. In this transfer station 5, the luggage 4 is loaded onto the platform 3 manually by a feed conveyor 7 which adjoins the transporting path 6 of the vehicle 2 and is constructed as a belt conveyor and aligned at right angles to the transporting path 6.

Figure 2:
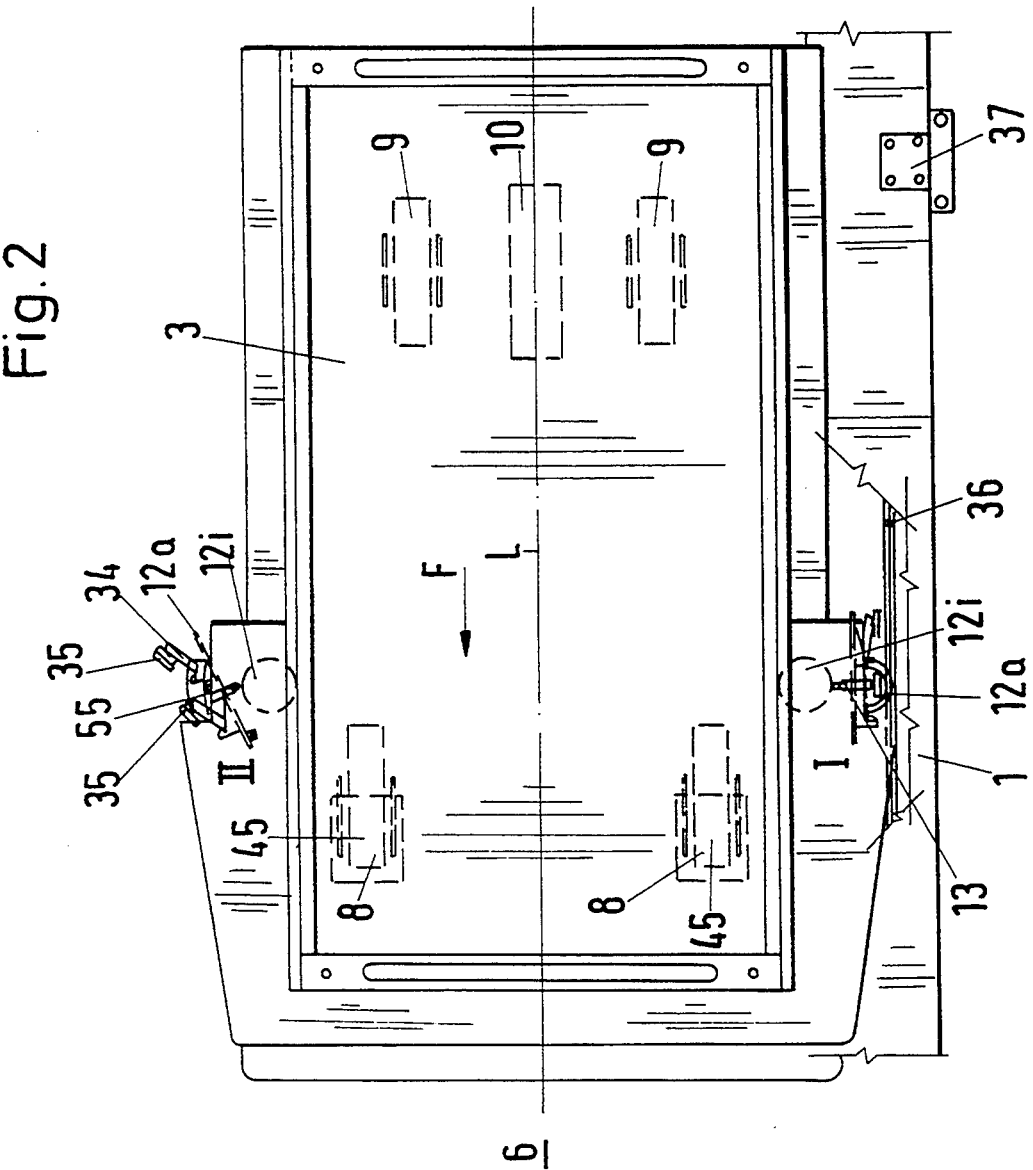
FIG. 2 shows a top view of the vehicle.

FIG. 2 shows a top view of the vehicle 2 which is guided to the left at a guide rail 1 as viewed in the traveling direction F. The vehicle 2 is movable via five wheels 8, 9, 10 on the floor 11 of the transporting path 6. Two of these five wheels are constructed as steering wheels 8 which are arranged at the front of the vehicle 2, as seen in the traveling direction F, and can be swiveled by roughly 40° around vertical axes to the right and left proceeding from the position parallel to the traveling direction F by swivel joints 45. The swivel joints 45 are arranged at the underside of the vehicle 2 in front of the axles of the steering wheels 8 as viewed in traveling direction F. Two other wheels of the five wheels 8, 9, 10 are provided as supporting wheels 9 and are arranged at the rear of the vehicle 2 as seen in the traveling direction F. The steering wheels 8 and the supporting wheels 9 are free-running and have no drive. A drive wheel 10 is arranged between the supporting wheels 9. The axis of the drive wheel 10 is arranged in a vertical plane with the axes of the supporting wheels 9 in the traveling position. The axes of the wheels 8, 9 and 10 are arranged at a distance of approximately one fourth of the length of the vehicle from the front and rear edges of the vehicle 2, respectively.

The vehicle 2 can be guided laterally at the guide rail 1 via a pair of guide rollers 12. For this purpose, the guide rollers 12 project out laterally beyond the frame-like contour of the vehicle 2 and engage with the guide rail 1 in a guidance position I. The outer guide rollers are designated by 12a and the inner guide rollers are designated by 12i. In the guidance position I, the guide rollers 12 are arranged one behind the other in a horizontal plane, as viewed transversely to the longitudinal direction L of the vehicle 2, while maintaining a gap 13 therebetween and are rotatable around vertical axes. The inner guide roller 12i is supported within the contour of the vehicle, but projects out of the latter at the sides.

Additionally, FIG. 2 shows that the guide rollers 12 are arranged between the steering wheels 8 and the supporting wheels 9 as seen in the longitudinal direction L. The distance between the guide rollers 12 and the front edge of the vehicle 2 is roughly one-third of the length of the vehicle 2.

Figure 3:
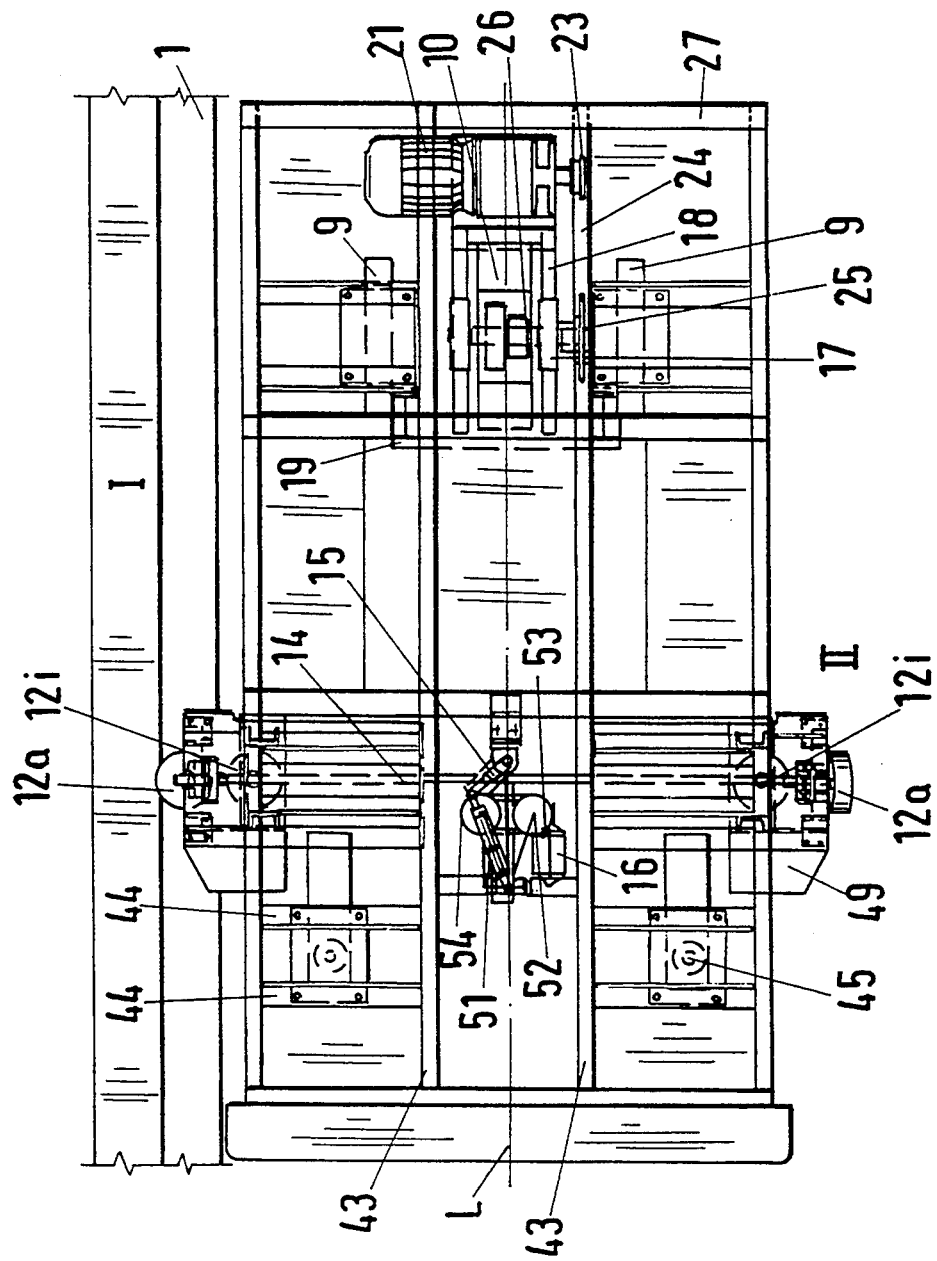
FIG. 3 shows a top view of the vehicle without the superstructure.

FIG. 3 shows a top view of the vehicle 2, but without the superstructure. In contrast to FIG. 2, the vehicle 2 is guided on the guide rail 1 at the right side, as viewed in the traveling direction F, via the pair of guide rollers 12. The guide rollers 12 on the left-hand side of the vehicle are in the open position II, i.e. the outer guide roller 12a is swiveled up over the level of the upper edge of the guide rail 1 around an axis directed horizontally and parallel to the longitudinal direction L of the vehicle 2. The two outer guide rollers 12a are connected with one another via a rod linkage 14 so that only one of the two guide rollers 12a can ever be in the guidance position I or the open position II. The rod linkage 14 which is directed transversely to the longitudinal direction L of the vehicle 2 is connected in the center of the vehicle 2 with a swivelably supported lever 15. At its free end, the lever 15 has a recess for a driver 54 which can move the lever 15 into its two end positions corresponding to the guidance position I and the open position II of the guide rollers 12. For this purpose, the driver 54 is arranged at a continuous chain 53 which is guided via two chain deflecting wheels 52. One of the two chain wheels 52 is connected with a swivel drive 16 which is preferably constructed as an electric motor. In addition, a spring element 51 is arranged at the lever 15 and acts upon the latter in the direction of its respective end position. Accordingly, it is possible to move the driver 54 out of its recess after the lever 15 has completed a swiveling movement and accordingly to uncouple the chain drive 16, 52, 53, 54 from the lever 15 so as to disengage the drive connection.

Figure 4:
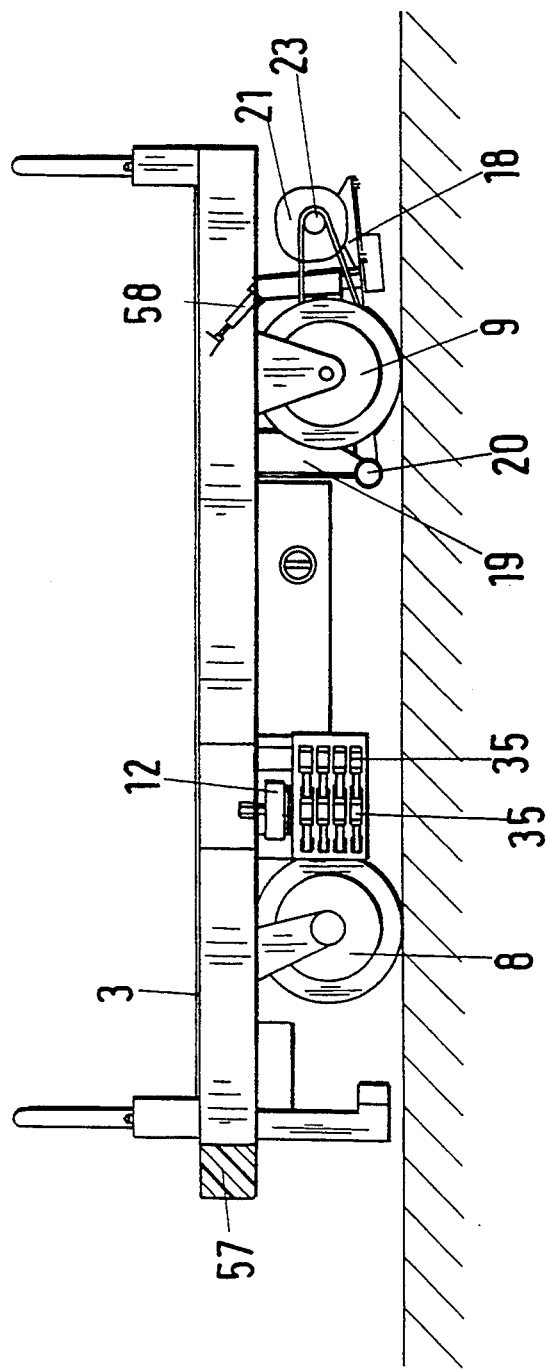
FIG. 4 shows a side view of FIG. 3.

FIG. 3 and in part FIG. 4, which is a side view of FIG. 3, shows that the vehicle 2 is substantially constructed from a rectangular base frame 27 which defines the outer contour and has in its center two longitudinal girders 43 which extend in the longitudinal direction L and are connected with the base frame 27 via crosspieces 44 in the region of the wheels 8, 9. Moreover, another transverse girder 19, at which a swinging frame 18 is supported via axles 20, is arranged in the region of the supporting wheels 9 between the longitudinal sides of the base frame 27. The axle 20 is aligned horizontally and transversely to the longitudinal direction L. The drive wheel 10 is supported proceeding from the axles 20 (see FIG. 4) in the center of the swinging frame 18 via bearing blocks 17 and a drive shaft 26. A travel motor 21 is arranged at the end of the swinging frame 18 remote from the axles 20. The drive wheel 10 is acted upon by the inherent weight of the travel motor 2 1 in the direction of the travel path. In principle, the drive wheel 10 may be acted upon by one or more springs, as necessary. The travel motor 21 transmits its drive forces via a chain wheel 23 arranged on its power-take off shaft which is aligned transversely to the longitudinal direction L. The chain wheel 23 is connected, via a drive chain 24, with another chain wheel 25 which is fastened to the drive shaft of the drive wheel 10. The travel motor is constructed particularly as a slow-speed three-phase current motor which makes do without a transmission, with the exception of the 1:2.5 gear ratio of the chain gear unit. Furthermore, a damper 58 is provided between the frame of the vehicle 2 and the swinging frame 18. It is also possible to lever up the swinging frame 18 and to lock it via a pin, not shown, at the base frame 27 of the vehicle 2 and accordingly, e.g. in the event of a disruption in operation, to lift the drive wheel 10 from the travel path 6 and push the vehicle 2 out of the travel path 6. In this swinging position, it is also possible in principle for the vehicle 2 to be pulled by another vehicle in the manner of a trailer.

Figure 5:
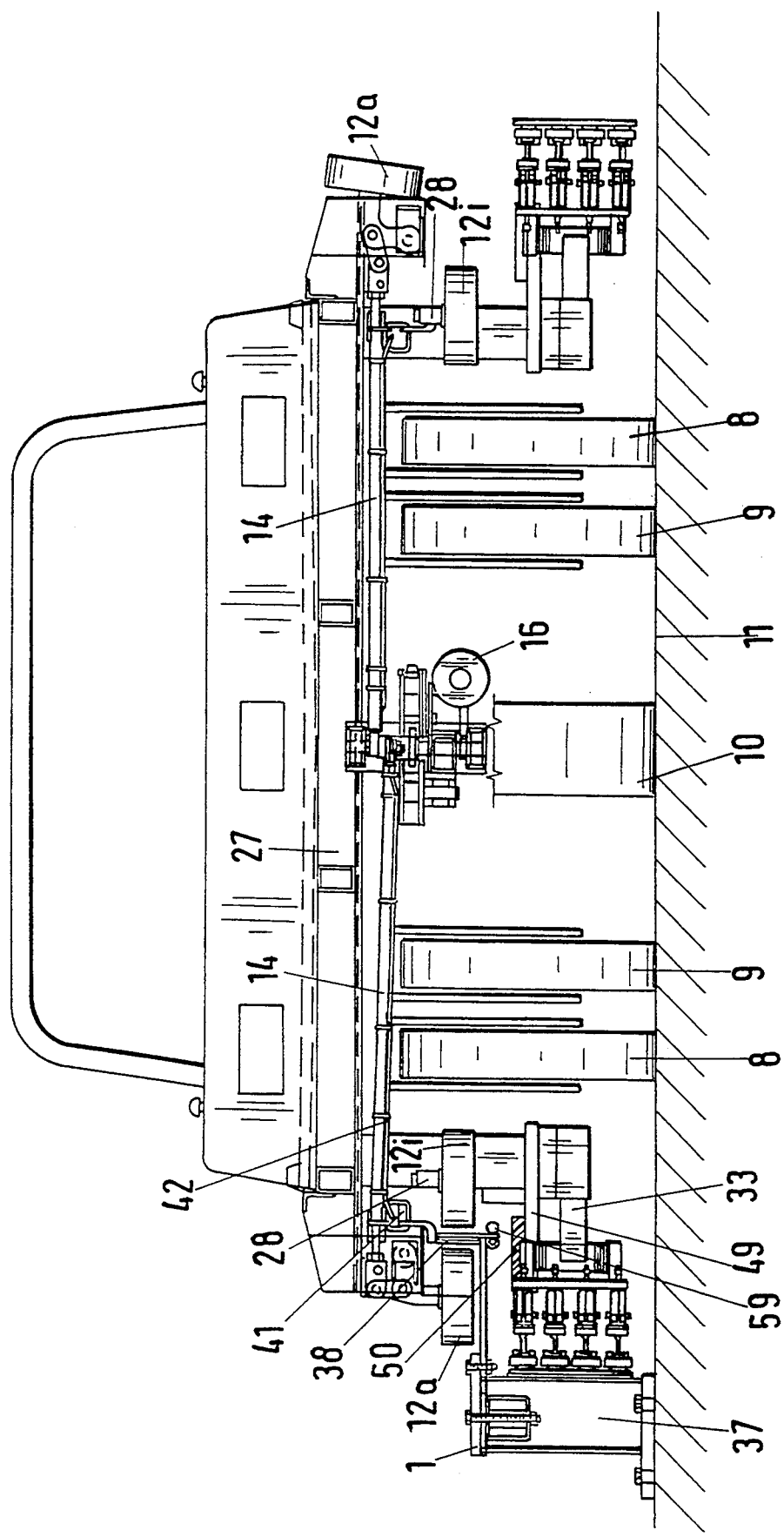
FIG. 5 shows a front view of FIG. 3.

FIG. 5 shows a front view of the vehicle 2. The arrangement of the wheels 8, 9 and 10 can be seen clearly in this drawing. The steering wheels 8 are arranged so as to be offset toward the inside at a distance from the outer contour of the vehicle roughly corresponding to one-sixth of the width of the vehicle. The supporting wheels 9 are likewise arranged so as to be offset toward the inside, roughly by one-fourth of the width of the vehicle. The running and supporting wheels 8, 9 are constructed as solid-rubber wheels suitable for airfield operation. The drive wheel 10 is pneumatic and provided with tread. The width of the drive wheel 10 is greater than that of the wheels 8, 9 so as to achieve a roughly comparable service life.

Additionally, FIG. 5 shows that a safety plate 49 with a sliding support 50 is arranged at the underside of the vehicle 2 under the guide rollers 12. The safety plate 49 is directed horizontally and projects below the long leg of the L-shaped guide rail 1 as viewed from the vehicle 2. The distance between the surface of the safety plate 49 and the underside of the long leg of the guide rail 1 is less than the distance from the lower edge of the guide rollers 12 in guidance position I to the upper edge of the short leg 38 of the guide rail 1. This prevents the vehicle 2 from jumping out of the guide rail 1 with its guide rollers 12 during operation, e.g. as a result of driving over irregularities in the ground.

It can be seen from FIG. 6, which is an enlarged view of the section from the region of the rail guide 1 shown in FIG. 5, that the inner guide rollers 12i are rigidly connected with the underside of the base frame 27 of the vehicle 2 via an axle 28 and the outer guide rollers 12a are swivelably supported at one end of an angle lever 29. The angle lever 29 substantially includes two arms which are arranged at right angles at one end, the guide roller 12a being supported at the latter, and the angle lever 29 being supported at the other end in an axle 46 extending horizontally and parallel to the longitudinal direction L. An arm 30 is articulated in the corner of the angle lever 29 via a pin 47 and is connected with a horizontally guided slide 22 via another pin 48, the slide 22 being connected in turn with a rod linkage 14. In the guidance position I, the end of the angle lever 29 remote from the guide roller 12a is supported on a horizontally arranged angular profile 31 so that the axis of the outer guide roller 12a is aligned vertically. The arm 30 is likewise vertically aligned in this position and directs tilting forces which may be transmitted to the outer guide roller 12a from the guide rail 1 via the arm 30 and the slide 22 into the base frame 27.

Moreover, a supporting member 32 which is aligned at right angles to the base frame 27 is fastened to the underside of the base frame 27, a rocker 33 being arranged at that end of the supporting member 32 remote from the base frame 27. The rocker 33 can swivel vertically around the arm 32 and is connected in an articulated manner with a base plate 34 at the end remote from the arm 32. The base plate 34 is acted upon outwardly in the direction of the contact lines 36 by a spring unit, not shown. Four current collectors 35 are arranged one above the other on the vertical base plate 34 and are likewise acted upon in the direction of the contact line 36 via rockers and springs. This ensures optimal contact of the current collectors 35 with the contact line 36 when the vehicle travels along curves. The four contact lines 36 which are arranged one above the other are fastened at the longitudinal sides of columns 37. The columns 37 are arranged at intervals one after the other in the traveling direction F and are fastened to the ground 11 at their lower end.

The guide rail 1 is fastened to the upper end of the column 37, and is constructed in the shape of an L as viewed in profile. The longer leg of the L-shape extends horizontally and is screwed to the upper side of the column 37 at its free end. The short leg 38 of the guide rail 1 which assumes the guiding function for the vehicle 2 is directed upward and includes two flat sections which are arranged at a distance of approximately 6 mm from one another. The gap formed between them is filled with damping material 39. Moreover, stop members 40 can be inserted into this gap and then fastened. These stop members 40 project into the space beneath the base frame 27 of the vehicle 2 and above the inner guide roller 12i. These stop members 40 are arranged in the regions of the transporting path 6 in which a switching of the guide rollers 12a is compulsory, since the rail-guided vehicle 2 would otherwise leave the transporting path 6. The switching of the guide rollers 12 is effected via a driver member 41 which is arranged at the vehicle 2 and can be actuated by the stop member 40. For this purpose, the stop member 40 is hook-shaped and the driver member 41 is annular and the driver members 41 are connected with the lever 15 via a traction mechanism. The driver members 41 are arranged at the rod linkage 14 so that the guide rollers 12 which are only located in guidance position I are situated in the region of the stop members 40. After the safety device described above is triggered, the vehicle is switched off in addition.

In the embodiment example, the invention is described with reference to a vehicle having a superstructure in the form of a platform which is inclined toward the center of the vehicle. However, it is certainly feasible within the scope of the invention to arrange a passenger cab, belt conveyor, roller path, shell-type tipping container or the like on the vehicle.

The invention is not limited by the embodiments described above which are presented as examples only but can be modified in various ways within the scope of protection defined by the appended patent claims.

We claim:

1. A transporting system, comprising; guide rails which laterally define a travel path that has branches; a floor conveyor vehicle having a front and back, as seen in a travel direction, and which is guided by the guide rails and has two longitudinal sides; a pair of guide rollers which are arranged at each of the longitudinal sides of the vehicle so as to engage with the guide rails at least on one side, the pair of guide rollers including inner and outer guide rollers; switching means for changing the travel path at a branch, the switching means being arranged at the vehicle and including a swivel drive for the outer guide rollers of the pair of guide rollers, the outer guide rollers being supported on the vehicle so as to be swivelable between a guidance position, in which the inner and outer guide rollers engage with the guide rail, and an open position in which the outer guide rollers release the guide rail; two steering wheels arranged at the front of the vehicle; two supporting wheels arranged at the rear of the vehicle, the outer guide rollers being arranged between the steering and supporting wheels so as to be offset toward the steering wheels at the longitudinal side of the vehicle; and a drive wheel swivelably connected to the vehicle between the supporting wheels.

2. A transporting system according to claim 1, and further comprising a rod linkage that connects the outer guide rollers with one another so that the outer guide roller of one longitudinal side of the vehicle is arranged in the open position and the outer guide roller of the other longitudinal side of the vehicle is arranged in the guidance position.

3. A transporting system according to claim 1, wherein the vehicle is guided exclusively at a guide rail outside of the branches.

4. A transporting system according to claim 1, wherein the supporting wheels are spaced at a distance relative to one another that is less than a distance between the steering wheels.

5. A transporting system according to claim 1, wherein the guide rail has an L-shape with one leg that is directed horizontally as seen in the direction of the travel path, and further comprising columns connected to the one leg of the guide rail so as to arrange the guide rail adjacent to the travel path.

6. A transporting system according to claim 5, and further comprising contact lines for current supply of the vehicle, the contact lines being arranged below the guide rail at the columns.

7. A transporting system according to claim 5, wherein the guide rail has another leg that is directed vertically as seen in the direction of the travel path, the vertical leg having a height, and further comprising a safety plate connected to the vehicle so as to project into a space between the guide rail and the travel path, the safety plate being at a distance from the horizontal leg of the guide rail that is less than the height of the vertical leg of the guide rail.

8. A transporting system according to claim 2, and further comprising a driver member which is arranged at the vehicle, and stop members arranged near ends of the guide rail so that a switching of the outer guide roller into the open position is effected when the stop members pass over with an outer guide roller into the guidance position via the driver member which is actuable by the stop member.

9. A transporting system according to claim 8, wherein each of the stop members is constructed as a hook and the driver members are constructed as a ring, and further comprising a traction mechanism provided so as to connect the ring with the lever.

* * * * *